United States Patent Office 3,468,624
Patented Sept. 23, 1969

3,468,624
PROCESS FOR THE RECOVERY OF AMMONIUM SALTS FROM WASTE STREAMS IN AN ACRYLONITRILE PLANT
Arthur F. Miller, Lyndhurst, and Milena L. Salehar, Cleveland Heights, Ohio, assignors to The Standard Oil Company, Cleveland, Ohio, a corporation of Ohio
No Drawing. Filed Feb. 14, 1966, Ser. No. 527,048
Int. Cl. C01c *1/24, 1/16, 1/18*
U.S. Cl. 23—119                                 5 Claims

ABSTRACT OF THE DISCLOSURE

Mineral acid ammonium salts are recovered from the waste water streams produced in the waste water distillation columns in the manufacture of acrylonitrile and methacrylonitrile, which streams also contain undesirable organic constituents, by adding to said stream a nitrogen-containing compound selected from the group consisting of ammonia, methylamine, ethylamine, n-propylamine, n-butylamine, n-amylamine, dimethylamine, di-n-propylamine, trimethylamine, ethylenediamine, trimethylenediamine, ethanolamine, diethanolamine and triethanolamine; maintaining the pH between 6.5 and 10; removing a portion of the water from the solution; cooling the solution and adding thereto additional amounts of the nitrogen-containing compound to effect precipitation therefrom of the ammonium salt.

---

The present invention relates to the recovery of ammonium salts from waste process streams in a manufacturing facility for $\alpha$-$\beta$ monoolefinically unsaturated nitriles. More particularly, the present invention is concerned with the recovery of ammonium salts from the waste-water stream which emanates from the bottom of a waste-water distillation column used in plants for the manufacture of acrylonitrile and methacrylonitrile.

Processes and catalysts for the manufacture of acrylonitrile and methacrylonitrile by the ammoxidation of propylene and isobutylene, respectively, have been described in U.S. Patents Nos. 3,152,170; 3,153,085; 3,197,419; 3,198,750; 3,200,081; 3,200,084; 3,200,141; and British Patent 987,960. In each of these processes a slight excess of ammonia is used. Some of this excess ammonia is carried off in the reactor effluent and is neutralized by a dilute acid forming an ammonium salt. This saline solution, from one point of view, is a disposal problem and from another, it is a potential source of fertilizer grade salts. The econmics of recovering the salt and successfully disposing of the remaining waste-water are closely linked to the profitable operation of the acrylonitrile or methacrylonitrile plants.

It is an object of this invention to separate the ammonium salt formed in the quenching step of the acrylonitrile manufacturing process from heavy organic byproducts in the quench solution.

It is a further object of this invention to separate crystalline commercially-salable ammonium salts from "waste water" which has been stripped of acrylonitrile and other desirable volatile organic products of reaction.

It is another object of this invention to solubilize the heavy organic content of this stripped waste-water stream to permit the removal of water in a water-removal apparatus, thus concentrating the solution so that the ammonium salt crystals may be preferentially precipitated out of solution while the heavy organic compounds are maintained in the mother liquor which is easily incinerated.

The following general description of the instant invention is specifically with respect to an acrylonitrile plant but is equally applicable, with obvious modifications, to a methacrylonitrile plant.

In U.S. Patent No. 2,904,580, filed Sept. 20, 1957, a process is described for the manufacture of acrylonitrile which comprises the gaseous phase catalytic reaction of propylene, ammonia and molecular oxygen-containing gas. In this vapor phase catalytic reaction preferably carried out in a fluidized bed type reactor, a part of the ammonia which is introduced as feed to the reactor is unreacted and consequently the effluent gases from the reactor contain, in addition to acrylonitrile, a small but nevertheless appreciable amount of ammonia, as well as some unreacted feed materials such as propylene, oxygen and nitrogen. The reactor effluent will also usually contain other reaction products such as hydrogen cyanide, acetonitrile, etc.

Acrylonitrile which is the principal product of the aforesaid process may be recovered from the reactor effluent gases by scrubbing the hot gases with a suitable solvent such as water or a glycol such as ethylene glycol, or a mixture of such solvents, in an absorber or quench tower. This is usually done after briefly heat-exchanging the effluent reactor gases with incoming feed gases and then leading the reactor effluent gases into the bottom of a quench tower in which it is counter-currently scrubbed with dilute acid. Any mineral acid may be used, but it is preferred to use an acid, the ammonium salt of which has good fertilizer value or a ready market. Such preferred acids are phosphoric, nitric, sulfuric and hydrochloric acids. The dilute mineral acid reacts with ammonia and makes it unavailable for the formation of byproducts resulting from the direct reaction of ammonia and acrylonitrile such as $\beta$-aminopropionitrile, $\beta$-$\beta'$imino dipropionitrile and $\beta$-$\beta'$-$\beta''$ nitrilo tripropionitrile. Despite the speed of the neutralization reaction, some cyanoethylation of the ammonia does take place, as not all the excess ammonia in the reactor effluent gases can be removed quickly enough. As a result, these cyanoethylated products react with other constituents of the reactor effluent stream and form various polymers. Some of them are quite heavy and most of them are characteristically soluble in water, with the result that the stream issuing from the bottom of the quench tower is a dilute water solution of the ammonium salt of the mineral acid used, containing some acrylonitrile and other desirable products of reaction, and contaminated with organic "heavies" in solution. Some of these heavies comprise partially hydrolyzed polyacrylonitrile, polyacrylamide, polymers of unsaturated aldehydes and unsaturated ketones, cyanhydrins and various cyanoethylated byproducts.

In a subsequent step, the bottoms from the quench tower is fractionated in a waste-water column, the overhead from which contains some acrylonitrile and other desirable organic compounds such as acetonitrile, hydrogen cyanide, propionitrile, etc. which are led into a refrigerated absorber. The bottoms from the waste-water column is a waste-water stream, the treatment of which is the subject of the instant invention.

Efforts to recover the valuable ammonium salt by removing water from this dilute solution, thus concentrating it, have heretofore been unsuccessful mainly because organic"heavies" precipitated from solution quickly plugged the equipment long before the solution was concentrated sufficiently to precipitate the salt from it.

It has been found that certain water-soluble, nitrogen-based compounds, or water solutions of these compounds when dissolved in the waste-water stream, are unexpectedly effective in maintaining the organic "heavies" in solution despite the removal of water, which results in a solution of high dissolved-solids content. Preferred nitrogen-based compounds are ammonia, methylamine, ethylamine, n-propylamine, n-butylamine, n-amylamine, dimethylamine, di-n-propylamine, trimethylamine, ethylenediamine, trimethylenediamine, ethanolamine, diethanolamine, and triethanolamine. More preferred are ammonia, ethylamine and ethanolamine.

As a result of this peculiar property of the aforementioned nitrogen-based compounds, it is now feasible to remove water from the waste-water column bottoms stream, thus concentrating the dissolved solids in the resulting solution without dropping out the organic heavies. Subsequently chilling this high-dissolved-solids solution and injecting a further quantity of one of the compounds mentioned above, forces crystals of the ammonium salt out of solution.

The following is a more detailed description of a specific embodiment of the process of the instant invention wherein the $\alpha$-$\beta$-monoolefinically unsaturated nitrile is acrylonitrile, the solvent used in the quench tower is water, the mineral acid used is dilute sulfuric acid, and the nitrogen-based compound is ammonia.

Feed comprising propylene, ammonia and air is led into a fluidized bed reactor wherein the ammoxidation of propylene yields acrylonitrile including some byproducts and unreacted ammonia, nitrogen, etc. This reactor effluent stream is heat-exchanged with incoming reactants in a shell-and-tube heat exchanger and the cooled effluent, at about 300–600° F., is led into the bottom of a quench tower. Here the reactor effluent gases flow upward and countercurrent to a downflowing stream of dilute sulfuric acid. Substantially all of the ammonia not reacted in the reactor is neutralized with the sulfuric acid forming ammonium sulfate which stays in solution in the water stream. Some acrylonitrile is also dissolved in this stream along with relatively non-volatile and relatively heavy water-soluble organic byproducts formed as byproducts. The bottoms from the quench tower containing dissolved ammonium sulfate and organic heavies is pumped from the bottom at a temperature of about 100–180° F. The major portion of this stream is recycled back to the top of the quench tower, the other portion being led to a waste-water column. A makeup stream comprising dilute sulfuric acid is continually sprayed into the top of the quench tower. The waste-water column is a conventional distillation column wherein desirable volatile organics such as acrylonitrile, acetonitrile, and the like are distilled off, about 25 to 90 percent of the feed to the column being taken overhead and led to an absorber. The bottoms from the waste-water column contains ammonium sulfate and dissolved heavy organic matter from which the ammonium sulfate is to be recovered. This stream contains from about 2 to about 20 percent ammonium sulfate, from about 1 to about 40 percent organic heavies in solution, along with from about 0.1 to 2 percent cyanide (as titrated) this being composed chiefly of cyanhydrin and some hydrogen cyanide. The waste-water bottoms stream is usually slightly acid. A typical composition of the waste-water column bottoms stream is shown in Table I.

Ammonia is injected into the waste-water column bottoms, substantially neutralizing the acid content of the stream. It is preferred that enough ammonia be added to maintain a range of about pH 6.5 to about 10.0. It would be undesirable to allow the pH to drop below 6.5 because substantial dropping out of organic heavies occurs. While the addition of an excess of ammonia, so that the pH would rise above 10.0, will not be materially adverse to the process of this invention, it is not foreseen that it will serve any useful purpose, and would unnecessarily increase the cost of recovering the salable ammonium salt.

Water may be removed from this waste-water stream by any of several well-known means. For example, the dilute solution may be heated either by heat exchange with a hot surface, or by direct submerged combustion of gases under the surface of the liquid, or by dialysis through a semi-permeable membrane, or by ion-exchange using an acidic ion-exchange resin such as carboxylic ion exchange resins. Another method of removing water from the solution, which might have particular utility under specially favorable conditions, is by freezing and fractional crystallization, forming ice crystals which would be continuously skimmed off. A preferred method of removing diluent water cheaply is by subsurface direct-combustion-evaporation in a conical bottom evaporator wherein the evaportion is preferably effected by submerged combustion in a central "evaporation zone." As diluent water is removed as vapor, the dissolved-solids content of the liquid in the "evaporation zone" increases, the density of the liquid in the zone increases and the resulting concentrated solution gravitates to the apex of the conical evaporator.

The overhead from the evaporator, an amount usually from about 65–88 percent of the feed to the evaporator, is predominantly water. It is heat-exchanged and disposed of. The bottoms from the evaporator contains from about 10–40 percent organic heavies, 10–40 percent ammonium sulfate and 20–80 percent water.

The bottoms from the evaporator is withdrawn and pumped through a chiller or cooler. The cooler may be ring type of heat exchanger wherein the concentrated liquid from the evaporator is cooled, preferably with a refrigerated countercurrent stream, so that the saline effluent stream from the cooler would be approximately 20 to 60° F. This cool concentrated stream is then saturated with more ammonia. For convenience, an ammonium hydroxide solution may also be used. It is to be noted that because of the relatively high concentration of ammonium sulfate and organic heavies in this stream, the amount of ammonia required to saturate this stream is relatively low. By "saturated" is meant that a sufficient quantity of ammonia is dissolved in the liquid stream, such that any further addition of ammonia to the stream results in no further accumulation of ammonia in the liquid.

This saturated stream is led into a crystallizer where the ammonium sulfate crystals precipitate out of solution, while the organic heavies do not.

The crystals are separated from the mother liquor, dried and bagged. Separation of the crystals may be effected by centrifuging the wet crystals, or by simple sedimentation, or by filtration. It is preferred to use a rotary vacuum filter for rapid efficient separation of the crystals from the mother liquor.

The mother liquor or filtrate still contains a small amount of dissolved ammonium sulfate which is not usually profitable to recover. This filtrate or a portion thereof, may be disposed of by incineration or some other suitable means.

However, the filtrate does contain an appreciable amount of ammonia with which it was saturated, and it is desirable that this be recovered for reuse. Accordingly, it is preferred to strip the valuable ammonia from the filtrate by any well-known means and to recycle it into the effluent waste-water stream from the cooler, immediately before crystallization. It is preferred to cool the recycled ammonia to the same temperature of the effluent waste-water stream from the cooler, before addition thereto. A preferred manner of stripping the ammonia from the filtrate is by heating the filtrate and then introducing it into a flash drum maintained under a slight vacuum.

It will be apparent that the undesirable organic heavies may be discarded anywhere in the process cycle but that it would be particularly advantageous to "bleed" the accumulated heavies at a point where they are not only concentrated but also substantially free of both the ammonium salt as well as the ammonia. Such a desirable point is soon after the flash drum. As has been pointed out before, the mother liquor or filtrate still contains some dissolved ammonium sulfate, and for better yields of salt crystals, it is desirable to recycle this filtrate, bled of some organic heavies back to the water removal unit.

The mother liquor, stripped of enough nitrogen-based compound to return the pH of the solution to about 7, is recycled to the evaporator. To prevent excessive build-up of solids-content in the evaporator, a portion of the stripped mother liquor is continuously withdrawn and incinerated, or disposed of in some suitable manner.

TABLE I

A specific composition of waste water column bottoms

Obtained from Lima acrylonitrile plant on June 26, 1964.

9.57 wt. percent solids (slow evaporation to dryness, 6 hrs. at 120° C.)
0.48 wt. percent cyanide
1.65 wt. percent $NH_3$ by titration
pH of 4.9–5.0
1.47% sulfur
Chemical oxygen demand, 45,404; 46,754; 44,022 p.p.m.
Total nitrogen of 2.17%

| Nitrogen types: | Percent |
| --- | --- |
| Nitrate | 0.0061 |
| Nitrite | 0.054 |
| Amide | 0.31 |
| $NH_3$ | 1.37 |
| Nitrile (by difference) | 0.42 |

| G.C.-M.S. analysis: | Percent |
| --- | --- |
| Acetaldehyde | 0.1 |
| Acrolein | 0.02 |
| HCN | 0.4 |
| Acetic acid | 0.2 |
| Fumaronitrile | 0.05 |
| Acrylic acid | 0.03 |
| Acrylamide | 0.1 |

Color similar to strong tea or coffee. Usually contains some catalyst fines.

EXAMPLE I 400 gm. of waste water column bottoms, the composition of which is shown in Table I, were adjusted to 9.8 pH by addition of 25 gm. reagent ammonium hydroxide (28% $NH_3$), and concentrated, by evaporation on a steam bath, to 87 gm. of dark aqueous solution. A few globules of insoluble organic material were noted. The solution was cooled to room temperature and saturated with gaseous ammonia. The precipitated organic globules disappear and the ammonium sulfate crystals are thrown out of solution, which when filtered yielded 14.8 gm. (weighed damp) of light brown crystals.

The crystals were dried in a vacuum dessicator at a temperature of about 110° C. for about 2 hours, and weighed to yield 13.6 gm. of free-flowing light brown crystals. Kjeldahl analysis showed that the crystals contained 20.82% nitrogen as ammonia, 0.39% water and no free acid. The moisture content was determined both by weight difference and by Karl Fischer analysis.

Since pure $(NH_4)_2SO_4$ contains 21.2% nitrogen as ammonia, an analysis of 20.82% nitrogen as $NH_3$ represents about 98.3% pure salt.

Since the salt content of the original 400 gm. sample containing 6.4% $(NH_4)_2SO_4$ is 25.6 gm., recovery of 13.6 gm. of crystals represents a yield of about 53.2 percent.

The crystals were further purified by washing with reagent grade $NH_4OH$ and dried to yield 99.8% pure $(NH_4)_2SO_4$.

EXAMPLE II 400 gm. of waste water column bottoms, the composition of which is shown in Table I, were adjusted to 8.25 pH by addition of 3.0 gm. reagent ammonium hydroxide (28% $NH_3$), and concentrated, by evaporation on a steam bath, to 87 gm. of dark aqueous solution. A few globules of insoluble organic material were noted. The solution was cooled to room temperature and saturated with gaseous ammonia. The precipitated organic globules disappear and the ammonium sulfate crystals are thrown out of solution and filtered.

The crystals were dried in a vacuum dessicator at a temperature of about 110° C. for about 2 hours, and weighed to yield 13.1 gm. of free-flowing light brown crystals. Kjeldahl analysis showed that the crystals contained 20.91% nitrogen as ammonia, 0.31% water and no free acid. The moisture content was determined both by weight difference and by Karl Fischer analysis.

Since pure $(NH_4)_2SO_4$ contains 21.2% nitrogen as ammonia, an analysis of 20.91% nitrogen as $NH_3$ represents about 98.6% pure salt.

Since the salt content of the original 400 gm. sample containing 6.4% $(NH_4)_2SO_4$ is 25.6 gm., recovery of 13.1 gm. of crystals represents a yield of about 51.3 percent.

The dried crystals were further purified by rinsing with absolute methanol and again dried to yield 98.3% pure $(NH_4)_2SO_4$.

Although the process of this invention has been specifically described in relation to the recovery of ammonium sulfate from waste-water in an acrylonitrile plant, the same process is used to treat a similar wastewater stream in a plant for the manufacture of methacrylonitrile from isobutylene, ammonia and oxygen. The by-products of reaction are different in that the heavy organic compounds formed differ from those formed in the acrylonitrile process by at least one substituted methyl group, but their water-solubility characteristics are very similar.

We claim:

1. A process for recovering mineral acid ammonium salt crystals from a waste-water stream produced in a facility for the ammoxidative manufacture of an alpha-beta monoolefinically unsaturated nitrile from a monoolefin comprising:
   (a) adding to said waste-water stream at least one nitrogen based compound selected from the group consisting of ammonia, methylamine, ethylamine, n-propylamine, n-butylamine, n-amylamine, dimethylamine, di-n-propylamine, trimethylamine, ethylenediamine, trimethylenediamine, ethanolamine, diethanolamine, and triethanolamine,
   (b) maintaining a pH range from about 6.5 to about 10,
   (c) removing at least some of the water,
   (d) cooling the resulting soultion to obtain a chilled solution,
   (e) adding a further quantity of at least one said nitrogen-based compound sufficient to saturate said chilled solution,
   (f) crystallizing said ammonium salt from said chilled solution,
   (g) separating the crystals from the mother liquor, and
   (h) drying said crystals.

2. The process of claim 1 wherein said mother liquor from step (g) is separated from said nitrogen-based compound, said separated nitrogen-based compound is added to said chilled solution from step (d) and at least some of said separated mother liquor is recycled to step (c).

3. The process of claim 1 wherein said alpha-beta monoolefinically unsaturated nitrile is acrylonitrile, said monoolefin is propylene, said ammonium salt is ammonium sulfate and said nitrogen-based compound is ammonia.

4. The process of claim 1 wherein said alpha-beta monoolefinically unsaturated nitrile is methacrylonitrile, said monoolefin is iso-butylene, said ammonium salt is ammonium sulfate and said nitrogen-based compound is ammonia.

5. The process of claim 3 wherein removal of water in step (c) is effected by evaporation, crystallization of ammonium sulfate in step (f) is effected in a continuous crystallizer and separation of said crystals of step (g) is effected in a continuous rotary vacuum filter.

References Cited

UNITED STATES PATENTS 2,769,686  11/1956  McCullough et al. __ 23—119 X
3,328,266   6/1967  Modiano et al. ___ 260—465.3 X OSCAR R. VERTIZ, Primary Examiner
E. C. THOMAS, Assistant Examiner U.S. Cl. X.R.

23—100, 103, 107, 302; 260—465.3, 465.9